Feb. 29, 1944.     F. E. COLLIER     2,343,171
JOINTING GUIDE FOR SAW FILING MACHINES
Original Filed Aug. 3, 1940    3 Sheets-Sheet 1
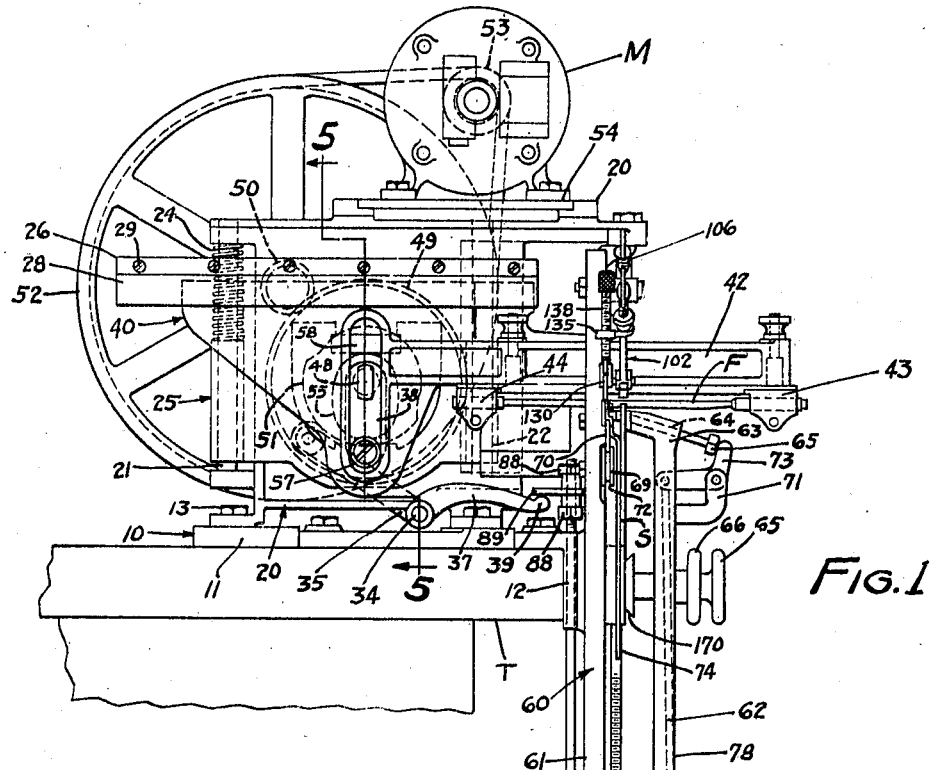

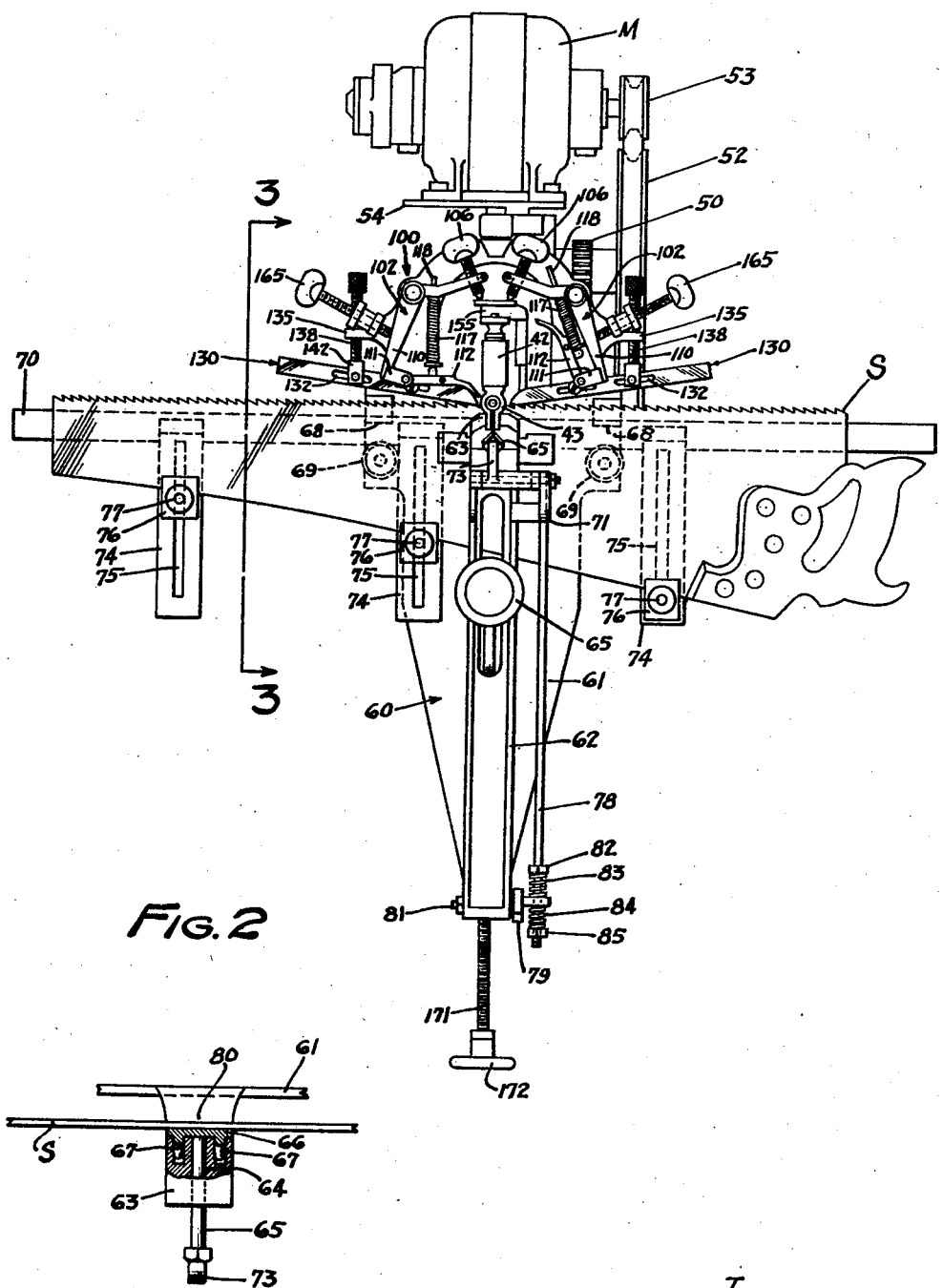

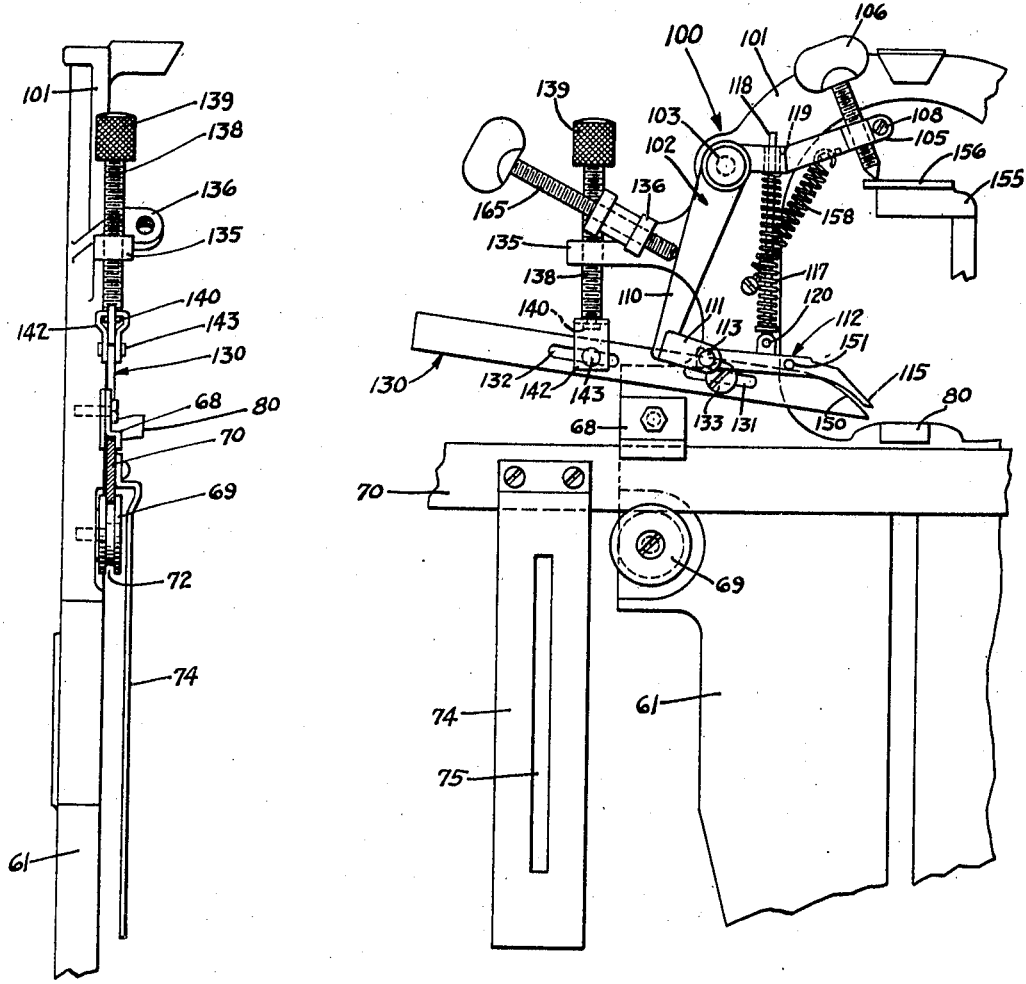

Patented Feb. 29, 1944

2,343,171

UNITED STATES PATENT OFFICE 2,343,171

JOINTING GUIDE FOR SAW FILING MACHINES

Freeman E. Collier, Minneapolis, Minn., assignor to Foley Manufacturing Company, Minneapolis, Minn., a corporation of Minnesota Original application August 3, 1940, Serial No. 350,577, now Patent No. 2,310,517, dated February 9, 1943. Divided and this application April 1, 1942, Serial No. 437,280

4 Claims. (Cl. 76—77)

The present invention relates to saw filing machines and more particularly to improvements in saw filing machines of the type shown in my prior Patent #1,728,393. In machines of this character, the saw being filed is supported for traversing movement with respect to the file, and such movement is imparted to the saw by a pawl mechanism which is periodically moved during operation of the machine. The present invention is particularly directed to improvements in the saw and file supporting means and in the pawl mechanism whereby the saw is moved as desired without erratic action due to the lodging of saw filings in delicately adjusted portions of the mechanism, and the motion controlled accurately for saws of various types.

It is accordingly an object of the invention to provide a saw filing machine in which the parts are so arranged as to be free from interference and wear due to saw filings which inevitably accumulate during the saw filing operation.

It is a further object of the invention to provide a saw filing machine in which the saw filing mechanism may be quickly and easily adjusted for saws having various sizes of teeth.

It is a further object of the invention to provide an improved saw supporting means capable of tightly gripping the saw during filing and of gripping the saw with lesser force during progressing movement of the saw.

It is a more specific object of the invention to provide a saw filing machine in which the movable elements of the saw filer are all carried at an elevation above the saw whereby saw filings are prevented from lodging on such mechanisms and to provide in such a machine improved saw carrying mechanisms whereby the saw may be moved endwise free from interference by saw filings, and in which the jointing guide and pawl mechanism may be accurately and quickly changed to accommodate saws of various types and accurately held in adjusted position.

These and other objects of the invention inherent in the apparatus illustrated and described will be apparent from the drawings in which Figure 1 is a side elevational view of the apparatus of the present invention.

Figure 2 is a front elevational view.

Figure 3 is an enlarged fragmentary side elevational view taken along the lines 3—3 of Figure 2.

Figure 4 is an enlarged fragmentary front elevational view of the portions of the apparatus shown in Figure 3.

Figure 5 is an enlarged fragmentary view partly in section taken along the lines 5—5 of Figure 1.

Figure 6 is a fragmentary plan view partly in section of the saw clamping apparatus.

Throughout the drawings, the same numerals refer to corresponding parts.

Referring now to the drawings: The apparatus consists of a bed plate, generally designated 10, which is formed with a horizontal portion 11 and a downwardly turned front edge portion 12, which is adapted to be placed upon and bolted to a work bench or table T by means of bolts 13 and 14.

Upon the bed plate, there is mounted a main frame member, generally designated 20, which is provided with a pair of vertically arranged ways 21 and 22, positioned at the front and the back of the main frame member 20. Preferably, these ways are round steel rods and are supported so as to receive a carrier mechanism, generally designated 25. The carrier mechanism slides vertically upon the ways and is normally held in the down position by means of springs 24, which surround the way rods 21—22 above the carrier mechanism.

Referring particularly to Figure 5, it will be noted that the carrier mechanism 25 is provided at its upper portion with a horizontally disposed way 26 composed of opposed V-shaped guides 27 and 28. The guide 28 is attached to the carrier mechanism portion 27 by means of screws 29, and the portion 28 is provided with an adjustable gib 31, which may be moved toward and away from the V-notch of portion 27 by means of screws 32, which are locked in adjusted position by means of lock nuts 33. The horizontal ways 27—28 of the carrier mechanism are shaped to receive the upper portion 35 of the file carrying arm, generally designated 40. The file arm slides back and forth in the ways 27—28. The file arm is provided with a central vertically aligned opening 38 and with a forwardly extending file arm portion 42. The file arm portion is provided with openings to receive front and rear file mounting brackets 43 and 44 upon which the file F is mounted.

It will accordingly be seen that the file F may be moved up and down by virtue of the vertical reciprocating motion of the carrier member 25 as the latter moves on the vertical ways 21—22, and that the file arm 42 may be provided with a reciprocating horizontal motion by virtue of the to and fro motion of the portion 35 of the file arm 40 in the horizontal ways 27—28 of the carrier.

In order to provide the filing motion, the main frame member 20 is provided with a shaft 48 (see Figure 5), which is arranged to be rotated by means of a large gear wheel 49. The latter meshes with a small pinion gear 50, directly connected to a large V-belt drive pulley 52, and the latter is driven from the pulley 53 of motor M. The motor M is mounted upon a carrying bracket 54 attached to the upper portion of frame 20.

Upon the shaft 48, there is mounted an eccentric cam 55 and also an arm 56, which carries an eccentrically mounted roller 57 upon screw 59. The cam 55 is shaped as shown in the dotted lines in Figure 1 and at its upper portion bears against a wear piece 58 of the carrier member 25. Accordingly, as the shaft 48 rotates, the cam 55 rides against the wear plate 58 and reciprocates the carrier member 25 vertically upon the vertical ways 21 and 22. At the same time, the arm 56 carrying roller 57 turns with the cam, and the roller is located so that it moves in the vertically arranged slot 38 of the file arm 40 and accordingly the file arm is moved backwards and forwards in the horizontal ways 27—28 synchronously as the carrier (and accordingly the file arms) are moved vertically due to the motion of cam 55.

The cam 55 and roller 57 are so shaped and oriented that the file F is progressed forwardly until the file has reached an extreme forward position at which time the carrier member 25, and file arm 40, are raised and drawn backwardly until the file F has reached a rearmost position. The file is then lowered into place ready for another forward stroke.

The main frame 20 is provided with a small through shaft 34, which is journaled in the frame 20 so as to be freely oscillatable. Upon one end of the shaft 34, there is fixedly attached a lever arm 35 having a roller 36 thereon. The gear wheel 49 is provided with an integrally formed eccentric cam 51 shaped as shown by the dotted lines in Figure 1. The cam has high and low portions, each approximately 180° of the circumference, and these bear against and control the position of roller 36, thereby oscillating arm 35 and shaft 34 through a small arc of motion for each rotation of shaft 48.

Upon the other end of shaft 34, there is fixedly mounted another arm 37 which extends forwardly of the machine, terminating in an operating knob 39, and therefore the arm 37 is raised and lowered through a small arc for each rotation of shaft 48.

Since the file F is well below the level of the horizontal ways 27 and 28, there is little tendency for saw filings to lodge in the ways and accordingly the file arms operate smoothly and the ways are subjected to but very little wearing action. Even when such wear may accur, it may be compensated for by adjustment of the gib 31 by means of screws 32 and lock nuts 33.

The present apparatus is adapted for the filing of hand saws, band saws, and circular saws. The saw undergoing the filing operation is held in place by means of a saw clamp, generally designated 60, which is attached to the forward downwardly turned portion 12 of the frame member 10. The saw clamp 60 consists of a rear portion 61 to which, at the lower end, there is pivotally attached a front clamp member 62. The clamp member 62 has an inturned upper clamp tip 63. The clamp member 62 is arranged to be drawn towards the member 61 by means of a screw having a hand wheel 65 and a lock wheel 66.

The tip 63 is provided with an angularly disposed drill hole 64 through which a pin 65 extends. The headed end of the pin extends outwardly, and the opposite end is attached to a movable clamp face 66, the clamp face being prevented from turning by a pair of protuberances 67 on the clamp face, which slide in suitable holes in the tip 63.

The front clamp 62 is provided with a fixed pivot mounting 71 upon which a bell crank lever 73 is pivoted. One end of the bell crank lever bears against the head of pin 65, while the other end is connected to a draw link 78 which extends downwardly to a lever 79 pivoted at bolt 81.

The rod 78 is provided with a fixed collar 82 against which a spring 83 bears. The lever 79 bears against the spring 83 and is held tightly by another spring 84, which is upon the lower portion of rod 78, the spring 84 in turn being held by nut 85. Thus flexibility of motion, within the limits of springs 83 and 84, is provided between lever 79 and rod 78.

To the rear end of lever 79, there is pivotally attached an upwardly extending rod 86, which extends through a hole in the front edge 12 of the base 10. The rod 86 is threaded at its upper end to receive a pair of nuts 88 between which a semi-circular plate 89 is clamped, the plate 89 being positioned to be engaged by the operating knob 39 on lever 37.

Upon the frame member 60, there are mounted a pair of clips 68, and below each of the clips there is positioned a grooved roller 69. The clips 68 and rollers 69 are spaced apart so as to receive a saw carrying frame member 70, which has uniform width and thickness throughout its length. The frame member 70 is positioned so that its lower edge rides in the groove 72 of the rollers 69, and its upper edge is held from displacement by means of the clips 68. Upon the carrying frame member 70, there are a plurality of downwardly extending clamp pieces 74 in which there are vertical openings 75 formed to receive clamp members 76 and clamp bolts 77. The members 74, together with their clamp member 76 and bolts 77 are provided for holding the back edge of a hand saw S, which is shown in the light weight lines of Figure 2. The entire frame, consisting of member 70, and the member 74 together with the saw S then moves endwise during the filing operation.

The endwise movement of the saw is accomplished by means of a pawl mechanism, generally designated 100. Two such pawl mechanisms are shown in Figure 2 and they are used alternatively for movement of the saw either to the right or to the left depending upon the direction of the teeth of the particular saw undergoing filing.

Referring particularly to Figure 4, in which one of the pawl mechanisms is shown, it will be observed that the mechanism consists essentially of an upper frame bracket 101, which is preferably made integrally with the portion 61 of the saw clamping member. The frame member 101 has a bell crank, generally designated 102, mounted thereon by means of a pivot 103. The bell crank has a forwardly extending arm 105 in which a thumb screw 106 is threaded. The forward end of the arm 105 is bifurcated and is arranged to be drawn together by means of a lock screw 108 so as to hold the thumb screw 106 in any adjusted position. The downwardly extending arm 110 of the bell crank lever has a forwardly extending portion 111, upon which a pawl, generally designated 112, is mounted. The pawl 112 is pivoted upon the member 111 at the pin 113, and has a downwardly extending tooth engaging portion 115.

To the upper portion of the pawl, there is pivotally connected a rod 118, which extends upwardly through an opening 119 in the arm 105. Circumscribing the rod 118, there is a spring 117, which is compressed as the pawl 112 is raised, and accordingly, the pawl is normally forced downwardly towards the saw. The position of the pivotal connection 120 between the rod 118 and the pawl is such that when the pawl is raised to the position of the right hand pawl 112 of Figure 2, the spring will be in the over-center position and will maintain the pawl in raised condition.

To the rear of the bell crank 102 and pawl 112, there is mounted a jointing guide, generally designated 130, which is provided with a pair of slots 131 and 132. The guide 130 is held to the member 101 by means of a mounting screw 133, which passes through the slot 131. The jointing guide 130 may accordingly be moved endwise and also pivoted around the screw 133. The pivot screw 133 holds the jointing guide snugly but not so tightly that it cannot be moved under the influence of screw 138 described below.

Extending to the left from bracket 101, as shown in Figure 4, there is a horizontally extending bracket member 135, which also carries a supplementary bracket 136. The bracket 135 is formed to receive a vertical adjusting screw 138 which has a knurled upper portion 139, and the lower end of the screw is provided with a headed pivot 140, which receives a bifurcated clip 142, the latter being attached to the jointing guide 130 by means of a through pin 143. Accordingly, as the screw 138 is turned, the clip 142 is moved upwardly or forced downwardly, according to the direction of turning, and the jointing guide may accordingly be very accurately moved with reference to the saw.

The forward end of the jointing guide 130 is provided with a downwardly curved surface 150 upon which a rearwardly extending pin 151 of the pawl 112 is arranged to ride. The carrier member 25, which as it will be recalled, moves vertically on the guides 21—22, is provided with a forwardly and upwardly extending bracket portion 155 (see Figure 2), carrying a wear pad 156. The wear pad accordingly rises and falls periodically during the filing operation and as it rises, contacts the lower portion of adjusting screw 106 and causes the bell crank 102 to be moved in a counter-clockwise direction against the action of spring 158. This moves the pawl 112 to the right as shown in Figure 4 and since the pawl is normally forced downwardly by means of spring 117, the pin 151 may ride upon the upper surface of the jointing guide 130 and the pawl will drop downwardly as determined by the forward downwardly curved surface 150 of the jointing guide. The shape of the jointing guide is such that the forward end of the pawl 115 will move forward over the near tooth and then drop abruptly downward into contact with the filed tooth of the saw which is accordingly moved to the right as shown in Figures 2 and 4, thus advancing the saw exactly one tooth space.

During this time, the file has been retracted and as the carrier member 25 is lowered under the action of the cam 55, the pad 156 is likewise lowered and therefore the bell crank 102 and the attached pawl 112 are all retracted under the influence of spring 158 out of the way of the file F.

The retracted position of the bell crank lever 102 and pawl 112 is determined by means of an adjustment screw 165, which is mounted in the bracket member 136. The screw 165 bears against the downwardly extending portion 110 of the bell crank lever 102 and determines its most retracted position.

In use, the saw S, to be filed, is mounted on cone 170 or in frame 70, and the saw clamp member 62 is drawn up snugly but not so tightly as to hold the saw immovably between anvil 80 and clamp face 66. As the carrier frame 25 is raised and as the file arm 40 is retracted, the pawl mechanism operates to advance the saw one or two teeth as the case may be, and during this time it is desired that only a light clamping pressure be exerted by clamp face 66 upon the saw S, so as to hold it against anvil 80. During this portion of the movement, the low half of cam 51 (on gear wheel 49) is adjacent roller 36 on arm 35 (see Figures 1 and 5) and shaft 34 is oscillated clockwise as shown in Figure 1, thereby allowing rod 86 to move down and rod 78 to move up. This causes bell crank 73 also to rock in a clockwise direction and relieves pressure on pin 65, whereby the clamp face 66 seats against tip 63 of clamp member 62. Accordingly, the only pressure upon the saw S is that established by clamp bolt 65—66.

However, when notching movement of the saw is complete and as the file descends and begins its stroke, it is desirable greatly to increase the clamping pressure on the saw, so as to prevent chattering and hold the saw against any endwise movement away from the file during filing. The added clamping pressure is brought about as follows:

Just as the frame 25 is lowered by cam 55, the high part of cam 51 contacts roller 36, forcing the roller to the position shown in Figure 1. This causes lever 35, shaft 34 and lever 37 all to be moved in counter-clockwise direction (as viewed in Figure 1) whereupon knob 39 lifts plate 89 upwardly, drawing rod 86 upwardly. Through lever 79, and rod 78 this causes a counter-clockwise movement of bell crank lever 73 (as viewed in Figure 1) which in turn tends to cause pin 65 to be moved towards anvil 80. Since pin 65 is fixedly attached to the clamp face 66 and since this is already under light clamping pressure against the saw S, the bolt 65 can move but very little towards the anvil 80. Consequently the relative motion of bolt 65 with respect to tip 63 has the effect of springing the entire arm 62 outwardly and since the arm is only slightly flexible, a heavy clamping pressure is developed between face 66 and the anvil 80. The springs 83—84, however, serve to limit the clamping pressure.

Thus, when the saw is being moved by the pawl mechanism 100, no excessive resistance or drag is imposed upon the saw by the saw clamp, but while filing, the saw is immovably held against chattering and endwise movement.

In previous apparatus of this character, it has been customary to mount the saw carrying frame 70 upon spaced fixed blocks. In the present apparatus, the weight of the member 70 is taken upon rollers 69 which turn as the member 70 is progressed. Even though the rollers 69 are below the level of the file, the rotation of the rollers is such as to continuously dislodge filings, which may tend to lodge thereon, and accordingly the lodging of filings on rollers 69 does not occur with the result that the position of the saw is always accurately determined by the surface of the roller, and the saw is accordingly always accurately filed. This is a distinct advantage as compared with previous constructions wherein the way of the member 70 was carried upon slide blocks, which tended to accumulate saw filings thereby causing the saw carrying frame and the slide blocks to be worn during service with resultant looseness and dislodgment during filing, the looseness and dislodgment causing a deleterious inaccuracy in the filing.

The accuracy of the saw filing is further enhanced by the screw connection member 138 between the jointing guide 130 and the frame member 135, by means of which the jointing guide may be accurately positioned and held against dislodgment during the saw filing operation.

During the filing of the circular saw, the center of the saw is positioned at the cone surface 170 which may be vertically adjusted by means of adjusting screw 171 having a handle 172.

This application is a division of my application Serial No. 350,577 filed August 3, 1940, which matured into Patent No. 2,310,517, dated February 9, 1943.

Many obvious modifications may be made in the present apparatus without departing from the spirit of the invention illustrated, described and claimed.

I claim as my invention:

1. In a saw filing machine having a main frame, file reciprocating means on the frame and saw moving means including a feed pawl and means mounting the pawl for oscillating combined endwise and radial movement, an improved jointing guide means for guiding the end of said feed pawl during movement, said jointing guide being a bar mounted alongside the feed pawl and having a downwardly curved cam surface at one end adjacent the feed pawl in contact with which a part of the pawl engages for guiding the pawl through said oscillating combined endwise and radial movement, said jointing guide means having a pair of spaced elongated slots one near the middle and the other at an end opposite the cam surface end, a combined pivot and locking screw mounted on the frame and positioned to pass through the middle slot for slidably and rotatably mounting the jointing guide and an adjustment screw mounted on the frame in a position to intersect the bar at the end slot and a bifurcated clip connecting said adjustment screw and bar slot whereby the bar may be rotated about said combined pivot and locking screw, said bar being movable endwise along a line determined by said combined pivot and locking screw and the adjustment screw mounted bifurcated clip.

2. In a saw filing machine having a main frame, file reciprocating means on the frame and saw moving means including a feed pawl and means mounting the pawl for oscillating combined endwise and radial movement, an improved jointing guide means for guiding the end of said feed pawl during movement, said jointing guide being a bar having a downwardly curved cam surface at one end adjacent the feed pawl in contact with which a part of the pawl engages for guiding the pawl through said oscillating combined endwise and radial movement, said jointing guide means having a pair of spaced elongated slots one near the middle and the other at the end opposite the cam surface, a first pivot screw mounted on the frame and passing through said middle slot, and a second pivot passing through said end slot, said second pivot being mounted on manually adjustable screw means connected to the frame for moving said pivot in the plane of said jointing guide bar, whereby the bar may be rotated about said first pivot by moving said second pivot and whereby the bar may be moved endwise along the line connecting said pivots.

3. In a saw filing machine having a main frame, file reciprocating means on the frame and saw moving means including a feed pawl and means mounting the pawl for oscillating combined endwise and radial movement, an improved jointing guide means for guiding the end of said feed pawl during movement, said jointing guide being a bar having a downwardly curved cam surface at one end adjacent the feed pawl, said feed pawl having a part shaped to contact said cam surface for guiding the pawl through said combined endwise and radial movement, said jointing guide bar being provided with pivotal and sliding clamping means connected to the center portion of the bar for pivotally and slidably mounting said bar at its center portion, and manually movable means including a screw connecting the frame of the machine and a portion of said jointing guide bar remote from said pivotal clamping means, said screw being mounted transversely of said bar and substantially in the plane of pivotal movement of said bar for adjustably positioning said bar and slidably and pivotally connected to the bar.

4. In a saw filing machine, having a main frame, file reciprocating means on the frame and saw moving means including a feed pawl and means mounting the pawl for endwise and oscillatory radial movement, a jointing guide means comprising a bar having a cam surface for contacting a part of said feed pawl to guide the pawl into contact with a tooth of the saw being filed for progressing of the saw, said bar having a slot therein, a pivot mounting screw passing through a slotted portion of the bar at about the middle of the bar for slidably and pivotally mounting the bar, an adjustable attachment screw in the plane of pivotal movement of the bar and connected to the bar by means of a bifurcated member connected to a slotted portion of said bar, said adjustable attachment screw being arranged in a direction transversely of bar and connected to the frame of the machine.

FREEMAN E. COLLIER.